US 8,881,707 B2

(12) United States Patent
Katsurahara (10) Patent No.: US 8,881,707 B2
(45) Date of Patent: Nov. 11, 2014

(54) FAIL-SAFE CONTROLLER FOR DIRECT INJECTION ENGINE

(75) Inventor: Hiroshi Katsurahara, Okazaki (JP)

(73) Assignee: Denso Corporation, Kariya (JP)

(*) Notice: Subject to any disclaimer, the term of this patent is extended or adjusted under 35 U.S.C. 154(b) by 682 days.

(21) Appl. No.: 13/252,422

(22) Filed: Oct. 4, 2011

(65) Prior Publication Data

US 2012/0095669 A1    Apr. 19, 2012

(30) Foreign Application Priority Data

Oct. 18, 2010    (JP) .................. 2010-233668

(51) Int. Cl.
| | |
|---|---|
| F02D 17/00 | (2006.01) |
| F02D 41/22 | (2006.01) |
| F02D 41/04 | (2006.01) |
| F02M 65/00 | (2006.01) |
| F01M 1/24 | (2006.01) |
| F02D 41/38 | (2006.01) |

(52) U.S. Cl.
CPC ............ F02D 41/222 (2013.01); *F02D 41/042* (2013.01); *F02D 2041/227* (2013.01); *F02M 65/003* (2013.01); *F02D 2041/226* (2013.01); *F01M 1/24* (2013.01); F02D 41/221 (2013.01); *F02D 41/3809* (2013.01); *F02D 2041/223* (2013.01); *F02D 2041/224* (2013.01); *F02D 2200/0602* (2013.01); *Y02T 10/40* (2013.01)
USPC .......... 123/198 D; 123/458; 123/494; 701/114

(58) Field of Classification Search
CPC ...... F02M 1/24; F02M 65/003; F02D 41/042; F02D 41/222; F02D 2041/226; F02D 2041/227; F02D 2250/31; F02D 220/0602; F02D 17/04; F02B 77/08
USPC ........ 123/446, 447, 458, 198 D, 198 DB, 494; 701/102, 103, 104, 114; 73/114.41, 73/114.43
See application file for complete search history.

(56) References Cited

U.S. PATENT DOCUMENTS

| | | | | |
|---|---|---|---|---|
| 5,499,538 | A | * | 3/1996 | Glidewell et al. .......... 73/114.41 |
| 5,617,337 | A | * | 4/1997 | Eidler et al. ................. 702/104 |

(Continued)

FOREIGN PATENT DOCUMENTS

| | | |
|---|---|---|
| EP | 1 441 120 | 7/2004 |
| JP | 11-210532 | 8/1999 |

(Continued)

OTHER PUBLICATIONS

Office Action (2 pages) dated Jun. 25, 2013 issued in corresponding Japanese Application No. 2010-233668 and English translation (2 pages).

*Primary Examiner* — Thomas Moulis
(74) *Attorney, Agent, or Firm* — Nixon & Vanderhye PC (57) ABSTRACT

A fuel pressure varies according to whether a fuel pressure sensor and a high-pressure pump have a malfunction or not. In view of this, a first threshold Perr1 is defined for determining whether the fuel pressure sensor has a malfunction and a second threshold Perr2 is defined for determining whether the high-pressure pump has a malfunction. The second threshold Perr2 is greater than the first threshold Perr1. By comparing a detection value of the fuel pressure sensor with the first and the second threshold, a malfunction in the fuel pressure sensor and a malfunction in the high-pressure pump are distinguished from each other. A first fail-safe control or a second fail-safe control is executed according to a portion having a malfunction.

6 Claims, 8 Drawing Sheets

(56) References Cited

U.S. PATENT DOCUMENTS

| | | | |
|---|---|---|---|
| 5,723,780 A * | 3/1998 | Miwa et al. | 73/114.43 |
| 5,983,714 A * | 11/1999 | Izumiura et al. | 73/114.43 |
| 6,024,064 A * | 2/2000 | Kato et al. | 123/179.17 |
| 6,076,504 A * | 6/2000 | Stavnheim et al. | 123/447 |
| 6,209,521 B1 * | 4/2001 | Rembold et al. | 123/456 |
| 6,293,251 B1 * | 9/2001 | Hemmerlein et al. | 123/447 |
| 6,446,609 B2 * | 9/2002 | Mizuno et al. | 123/479 |
| 6,474,306 B2 * | 11/2002 | Muller et al. | 123/479 |
| 7,007,676 B1 * | 3/2006 | Schuricht et al. | 123/479 |
| 7,121,265 B2 * | 10/2006 | Joos et al. | 123/494 |
| 7,383,804 B2 * | 6/2008 | Wolber et al. | 123/179.16 |
| 7,412,968 B2 * | 8/2008 | Takayanagi et al. | 123/456 |
| 7,444,993 B2 * | 11/2008 | Hofmeister | 123/456 |
| 7,472,690 B2 * | 1/2009 | Takayanagi et al. | 123/446 |
| 7,798,872 B2 * | 9/2010 | Fujino et al. | 440/1 |
| 7,832,375 B2 * | 11/2010 | Dusa et al. | 123/446 |
| 7,909,020 B2 * | 3/2011 | Orikabe | 123/457 |
| 7,987,704 B2 * | 8/2011 | Lucido et al. | 73/114.43 |
| 8,091,532 B2 * | 1/2012 | Wang et al. | 123/446 |
| 8,133,083 B2 * | 3/2012 | Fujino et al. | 440/1 |
| 8,220,322 B2 * | 7/2012 | Wang et al. | 73/114.43 |
| 8,240,290 B2 * | 8/2012 | Miyake et al. | 123/446 |
| 8,439,014 B2 * | 5/2013 | Rollinger et al. | 123/446 |
| 8,573,185 B2 * | 11/2013 | Miura et al. | 123/458 |
| 8,666,639 B2 * | 3/2014 | Saruwatari et al. | 701/107 |
| 2005/0263146 A1 | 12/2005 | Oono et al. | |
| 2007/0209430 A1 * | 9/2007 | Awano et al. | 73/119 A |
| 2008/0209992 A1 * | 9/2008 | Murayama | 73/114.43 |
| 2009/0205413 A1 * | 8/2009 | Yamauchi et al. | 73/114.41 |
| 2014/0053812 A1 * | 2/2014 | Kojima | 123/457 |

FOREIGN PATENT DOCUMENTS

| | | |
|---|---|---|
| JP | 2000-274322 | 10/2000 |
| JP | 2006-029097 | 2/2006 |
| JP | 2008-175080 | 7/2008 |
| JP | 2009-540178 | 11/2009 |

* cited by examiner

FAIL-SAFE CONTROLLER FOR DIRECT INJECTION ENGINE

CROSS-REFERENCE TO RELATED APPLICATION

This application is based on Japanese Patent Application No. 2010-233668 filed on Oct. 18, 2010, the disclosure of which is incorporated herein by reference.

FIELD OF THE INVENTION

The present invention relates to a fail-safe controller for a direct injection engine in which fuel is directly injected into a cylinder.

BACKGROUND OF THE INVENTION

As for a direct injection engine, it is required to increase an injection pressure of fuel and to atomize the injected fuel in order to ensure its combustibility. A feed pump pumps up fuel from a fuel tank and a high-pressure pump pressurizes the fuel. The pressurized fuel is introduced into a fuel injector through a delivery pipe. A fuel pressure sensor is provided in a delivery pipe to detect the pressurized fuel pressure. The feed pump and the high-pressure pump are controlled so that the fuel pressure agrees with a target fuel pressure.

Such a high-pressure fuel supply system has a diagnosis function and a fail-safe function. For example, JP-11-210532A shows a system in which the pressurizing function of the high-pressure pump is suspended and the fuel pressure is decreased to a feed pressure depending on the feed pump when a malfunction is detected in a fuel pressure sensor. The engine runs while receiving the fuel from the feed pump. JP-2008-175080A shows a system in which the fuel pressure is ensured by a feed pump when a malfunction is detected in a high-pressure pump. The engine runs while receiving the fuel from the feed pump.

As above, in the high-pressure fuel supply system shown in JP-11-210532A and JP-2008-175080A, when a malfunction is detected in a fuel pressure sensor or a high-pressure pump, a fail-safe control is executed in order that the engine runs as long as possible while receiving the fuel from a feed pump.

When a malfunction is detected in a fuel pressure sensor or a high-pressure sensor, it is preferable that an appropriate fail-safe control is executed according to a portion/part in which a malfunction occurs and a time point at which a malfunction occurs. However, in the above described conventional system, it is not distinguished between a malfunction in a fuel pressure sensor and a malfunction in a high-pressure pump. When a malfunction occurs in a system, a predetermined fail-safe control is executed without respect to a faulty portion and a time point at which the malfunction occurs.

SUMMARY OF THE INVENTION

The present invention is made in view of the above matters, and it is an object of the present invention to provide a fail-safe controller for a direct injection engine, which is capable of detecting each malfunction in a high-pressure fuel supply system and executing a suitable fail-safe control according to a portion in which a malfunction occurs and a time point at which a malfunction occurs.

A fail-safe controller is applied to a direct injection engine. The direct injection engine includes:
a feed pump pumping up a fuel in a fuel tank;
a high-pressure pump pressurizing the fuel pumped up by the feed pump, and introducing the pressurized fuel into a delivery pipe;
a fuel pressure sensor detecting a fuel pressure in the delivery pipe; and
a fuel injector directly injecting the fuel accumulated in the delivery pipe into a cylinder of the direct injection engine.

The fail-safe controller includes a malfunction detecting means which detects a malfunction in the fuel pressure sensor by comparing a detection value of the fuel pressure sensor with a first threshold. The malfunction detecting means further detects a malfunction in the high-pressure pump by comparing the detection value of the fuel pressure sensor with a second threshold which is greater than the first threshold.

Furthermore, the fail-safe controller includes a fail-safe control means which executes a first fail-safe control in which the direct injection engine is kept running when the malfunction detecting means detects a malfunction in the fuel pressure sensor. The fail-safe controller executes a second fail-safe control in which the direct injection engine is turned off when the malfunction detecting means detects a malfunction in the high-pressure pump.

According to the above configuration, by comparing the fuel pressure with the first threshold and the second threshold, it is determined whether the fuel pressure sensor has a malfunction or the high-pressure pump has a malfunction. The first threshold and the second threshold are defined in view of a variation in the fuel pressure between a case that the fuel pressure sensor and the high-pressure pump have a malfunction and a case that the fuel pressure sensor and the high-pressure pump 14 have no malfunction.

When the fuel pressure sensor has a malfunction, a fail-safe control is executed in which the internal combustion engine is kept running. When the high-pressure pump has a malfunction, a fail-safe control is executed in which the internal combustion engine is turned off. That is, a suitable fail-safe control can be executed according to a portion (a fuel pressure sensor or a high-pressure pump) having a malfunction.

Furthermore, since the first threshold and the second threshold are not varied between the starting period and the running period, the detection of a malfunction can be easily conducted.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Embodiments of the present invention will be described, hereinafter.

First Embodiment

Referring to FIGS. 1 to 6, a first embodiment of the invention will be described.

Figure 1:
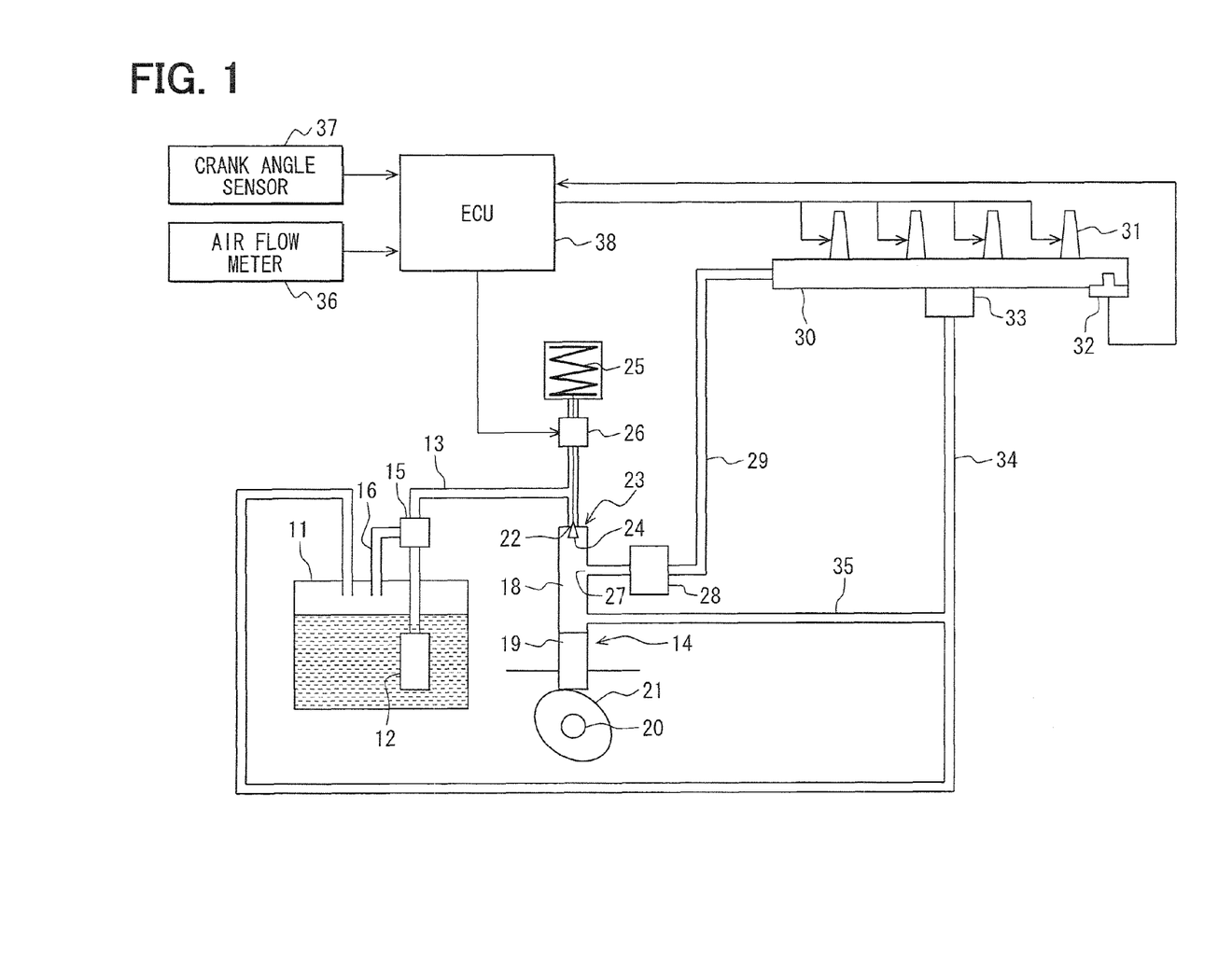
FIG. 1 is a schematic chart showing a fail-safe controller for a direct injection engine.

FIG. 1 shows schematic configuration of a fail-safe controller for a direct injection engine.

A low-pressure pump 12, which is referred to as a feed pump, is provided in a fuel tank 11 to pump up the fuel stored in the fuel tank 11. This feed pump 12 is driven by an electric motor (not shown) which receives electricity from a battery (not shown). The fuel discharged from the feed pump 12 is introduced into a high-pressure pump 14 through a fuel pipe 13. A pressure regulator 35 is provided in the fuel pipe 13. The discharge pressure of the feed pump 12 is adjusted to a predetermined pressure by the pressure regulator 35. A surplus of the fuel exceeding the predetermined pressure is returned to the fuel tank 11 through a fuel-return pipe 16.

The high-pressure pump 14 is a piston pump having a piston 19 which reciprocates in a pump chamber 18. The piston 19 is driven by a cam 21 connected to a camshaft 20. Alternatively, the high-pressure pump 14 may be driven by an electric motor.

The high-pressure pump 14 is equipped with a fuel pressure control valve 23 at its inlet port 22. The fuel pressure control valve 23 is a normally-opened-electromagnetic valve having a valve body 24, a spring 25 biasing the valve body 24 in its opening direction, and a solenoid 26 attracting the valve body 24 in its closing direction.

When the high-pressure pump 14 is in a suction stroke, the fuel pressure control valve 23 is opened so that the fuel is suctioned into the pump chamber 18. When the high-pressure pump 14 is in a discharge stroke, the fuel pressure control valve 23 is closed so that the fuel in the pump chamber 18 is pressurized to be discharged. The fuel pressure is controlled by adjusting a discharge quantity of the high-pressure pump 14. That is, a closing period of the fuel pressure control valve 23 is controlled to adjust a discharge fuel quantity and a discharge fuel pressure of the high-pressure pump 14.

When it is intended to increase the fuel pressure, a closing timing of the fuel pressure control valve 23 is advanced to prolong the closing period of the fuel pressure control valve 23 so that the discharge quantity of the high-pressure pump 14 is increased. When it is intended to decrease the fuel pressure, the closing timing of the fuel pressure control valve 23 is retarded to shorten the closing period of the fuel pressure control valve 23 so that the discharge quantity of the high-pressure pump 14 is decreased.

A check valve 28 is provided at an outlet port 27 of the high-pressure pump 14. The fuel discharged from a high-pressure fuel pump 14 is introduced into a delivery pipe 30 through a high-pressure fuel pipe 29. The fuel is distributed to a fuel injector 31 of each cylinder from this delivery pipe 30. A fuel pressure sensor 32 (fuel pressure detection means) is provided in a delivery pipe 30 or the high-pressure fuel pipe 29 to detect fuel pressure therein.

Further, the delivery pipe 30 is provided with a relief valve 22 for avoiding an excess pressure increase in the delivery pipe 30. A discharge port of the relief valve 22 is connected to the fuel tank 11 (or the fuel pipe 13) through a relief pipe 34.

A branch pipe 35 branched from the relief pipe 34 is connected to the pump chamber 18. When the fuel pressure in the delivery pipe 30 becomes greater than a specified relief pressure, the relief valve 33 is opened so that the fuel in the delivery pipe 30 is returned to the fuel tank 11 and the pump chamber 18 through the relief pipe 34.

Moreover, an air flow meter 36 which detects the intake air flow rate, and a crank angle sensor 37 which outputs pulse signals for every specified crank angle in synchronization with a rotation of a crankshaft (not shown) are provided in the engine. A crank angle and an engine speed are detected based on the output signal of the crank angle sensor 37.

The outputs of the sensors are inputted to an electronic control unit (ECU) 38. The ECU 38 includes a microcomputer which executes an engine control program stored in a Read Only Memory (ROM) to control a fuel injection quantity, an ignition timing, a throttle position (intake air flow rate) and the like.

The ECU 38 computes a target fuel pressure according to an engine driving condition, such as engine speed, engine load and the like, by means of a map. A discharge rate of the high-pressure pump 14 is feedback controlled in such a manner that the detected fuel pressure agrees with the target fuel pressure.

Figure 2:
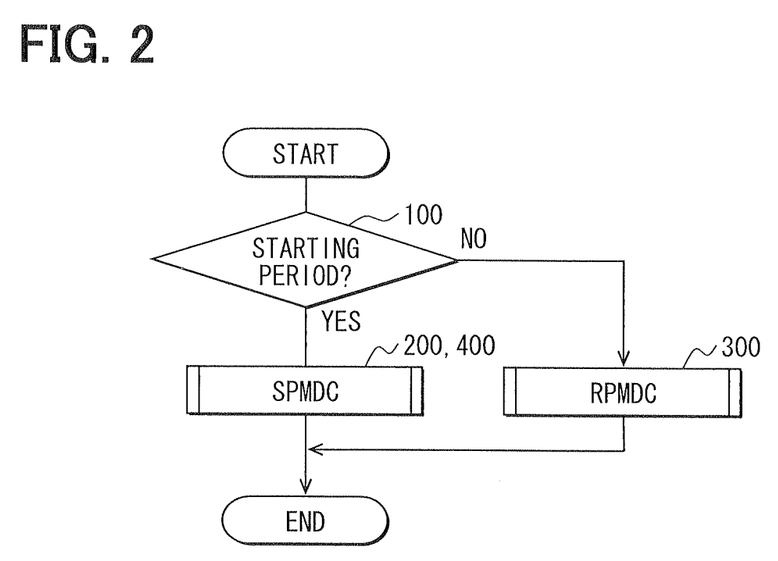
FIG. 2 is a flowchart showing a malfunction-detecting-control.

Referring to FIGS. 2 to 5, a malfunction-detecting-control (malfunction detecting means) which the ECU 38 executes will be described hereinafter. FIG. 2 shows a flowchart showing the malfunction-detecting-control, which is executed at a specified interval.

In step S100, the computer determines whether the engine is at a starting period in which the fuel pressure is low. For example, after a specified period has passed after the engine is stopped, the fuel pressure in the delivery pipe is low. In such a condition, if the engine is restarted, the engine is at the starting period. In the present embodiment, the computer determines whether the engine is at the starting period according to ON-OFF condition of an ignition switch and the fuel pressure.

When the answer is YES in step 100, the procedure proceeds to step 200 in which a starting-period malfunction-detecting-control, which will be referred to as SPMDC hereinafter, is executed. The SPMDC corresponds to a starting-period malfunction detecting means. When the answer is NO in step 100, the computer determines that the engine is running and the procedure proceeds to step 300. In step 300, a running-period malfunction-detecting-control, which will be referred to as RPMDC hereinafter, is executed. The RPMDC corresponds to a running-period malfunction detecting means. It should be noted that the ignition switch is tuned on and the engine is idling in a starting period. When a vehicle is running, the engine is in a running period.

Figure 3:
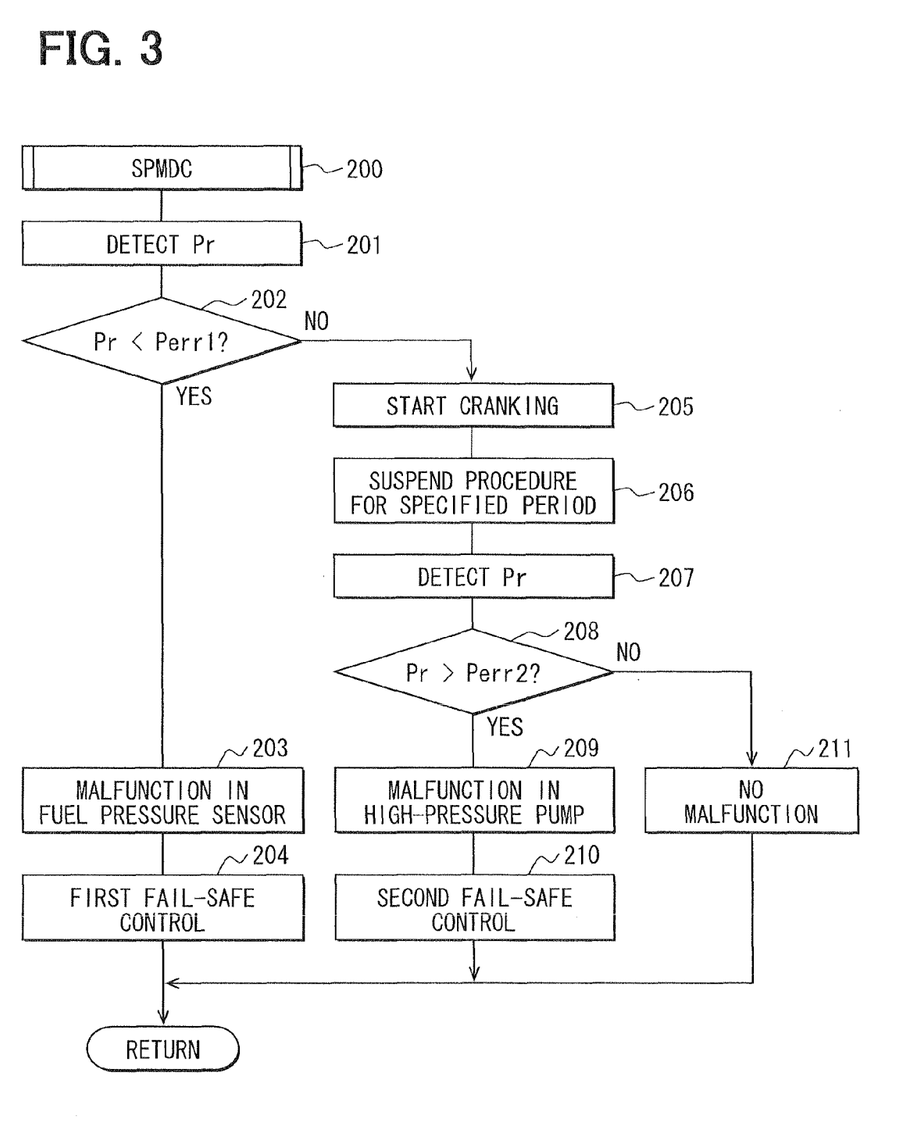
FIG. 3 is a flowchart showing a processing of a starting-period malfunction-detecting-control.

Referring to FIG. 3, the SPMDC will be described hereinafter. As described above, the SPMDC is executed during the starting period in which the fuel pressure is low. That is, the SPMDC is started to be executed under a condition in which the feed pump 12 is driven.

In step 201, the fuel pressure sensor 32 detects the current fuel pressure Pr. This detected pressure Pr is transmitted to the ECU 38. Then, the procedure proceeds to step 202 in which the computer determines whether the current fuel pressure Pr is less than a specified fuel pressure Perr1 which is referred to as a first threshold Perr1 (Pr<Perr1). The first threshold Perr1 is set lower than a feed pressure which depends on only the feed pump 12.

When the fuel pressure 32 has no malfunction, the fuel pressure Pr detected by the fuel pressure sensor 32 is close to the feed pressure. Thus, if the fuel pressure Pr is less than the first threshold Perr1, it can be determined that the fuel pressure sensor 32 has a malfunction. When the answer is YES in step 202, the procedure proceeds to step 203 in which the computer determines that the fuel pressure sensor 32 has a malfunction. Then, the procedure proceeds to step 204 in which a first fail-safe control is executed. In the first fail-safe control, a pressurizing function of the high-pressure pump 14 is suspended and the fuel pressure is maintained at the feed pressure. It should be noted that the fuel pressure control valve 23 is prohibited to be closed and a pressurization of the fuel by the piston 19 is prohibited when the pressurizing function of the high-pressure pump 14 is suspended.

Meanwhile, when the answer is NO in step 202, the procedure proceeds to step 205 in which a cranking of the engine is started. The camshaft 20 starts rotating and the high-pressure pump 14 starts to pressurize the fuel.

Then, the procedure proceeds to step 206 in which the procedure is suspended for a specified time period after an initial combustion. That is, the procedure is suspended until the engine speed becomes stable (idling condition). When the engine speed becomes stable, the procedure proceeds to step 207 in which the fuel pressure sensor 32 detects the current fuel pressure Pr of the fuel pressurized by the high-pressure pump 14. Then, the procedure proceeds to step 208 in which the computer determines whether the fuel pressure Pr detected in step 207 is greater than a second threshold Perr2 (Pr>Perr2).

The second threshold Perr2 is set slightly smaller than the relief pressure. Normally, the fuel pressure is controlled lower than the relief pressure by the fuel pressure feedback control. Therefore, when the high-pressure pump 14 has no malfunction, the fuel pressure Pr detected in step 207 is greater than the feed pressure and lower than the relief pressure. If the fuel pressure Pr is greater than the second threshold Perr2, it can be determined that the high-pressure pump 14 has a malfunction. Thus, when the answer is YES in step 208, the procedure proceeds to step 209 in which the computer determines that the fuel pressure sensor 32 has a malfunction. Then, the procedure proceeds to step 210 in which a second fail-safe control is executed. In the second fail-safe control, the engine is turned off and a restarting of the engine is prohibited.

Meanwhile, when the answer is NO in step 208, the procedure proceeds to step 211 in which the computer determines that the fuel pressure sensor 32 and the high-pressure pump 14 have no malfunction.

The SPMDC is executed as described above.

Figure 4:
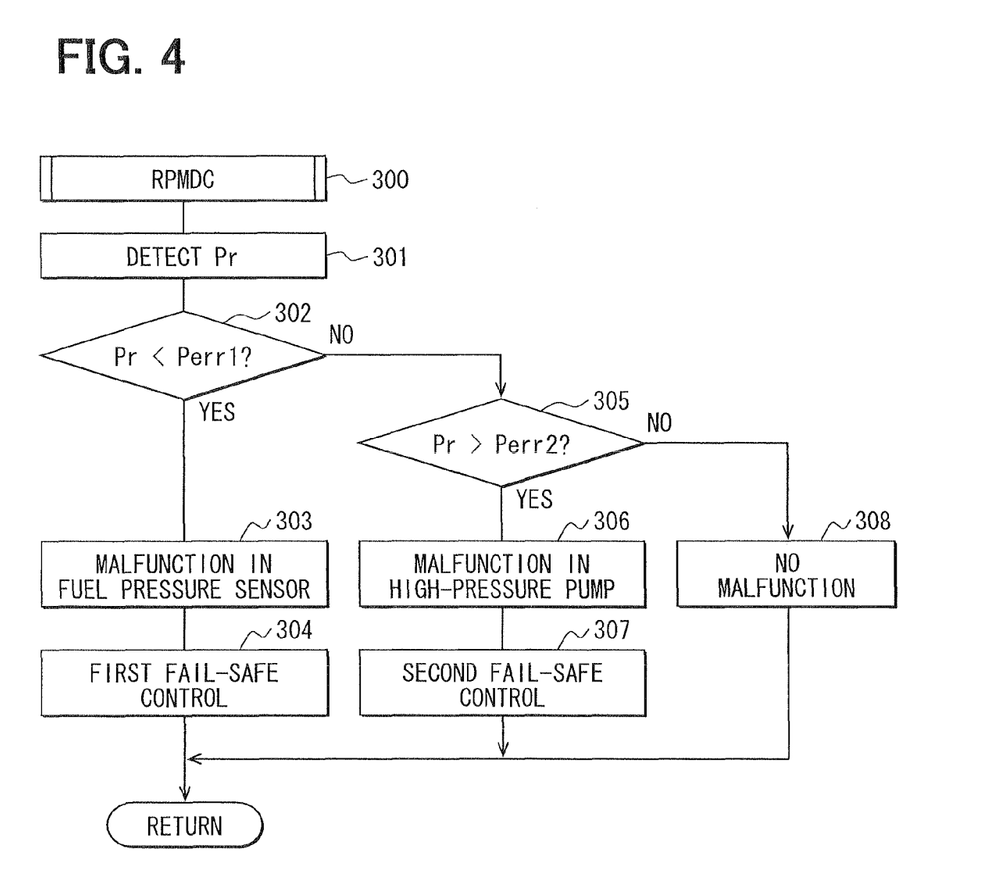
FIG. 4 is a flowchart showing a processing of a running-period malfunction-detecting-control.

Referring to FIG. 4, the RPMDC will be described hereinafter. The RPMDC is executed when the engine is stably idling or running.

In step 301, the fuel pressure sensor 32 detects the fuel pressure Pr of after the engine is stared. Then, the procedure proceeds to step 302 in which the computer determines whether the fuel pressure Pr detected in step 301 is less than the first threshold Perr1 (Pr<Perr1).

As described above, the first threshold Perr1 is lower than the feed pressure. The fuel pressure Pr detected in step 301 is the fuel pressure which is detected while the high-pressure pump 14 is driven. Thus, when the fuel pressure sensor 32 has no malfunction, the fuel pressure Pr is greater than the first threshold Perr1. If the fuel pressure Pr is less than the first threshold Perr1, it can be determined that the fuel pressure sensor 32 has a malfunction. When the answer is YES instep 302, the procedure proceeds to step 303 in which the computer determines that the fuel pressure sensor 32 has a malfunction. Then, the procedure proceeds to step 304 in which the first fail-safe control is executed. In the first fail-safe control, the pressurizing function of the high-pressure pump 14 is suspended and the fuel pressure is maintained at the feed pressure. Meanwhile, when the answer is NO in step 302, the procedure proceeds to step 305 in which the computer determines whether the fuel pressure Pr detected in step 301 is greater than the second threshold Perr2 (Pr>Perr2). When the answer is YES in step 305, the procedure proceeds to step 306 in which the computer determines that the high-pressure pump 14 has a malfunction. Then, the procedure proceeds to step 307 in which a second fail-safe control is executed. In the second fail-safe control, the engine is turned off and a restarting of the engine is prohibited.

Meanwhile, when the answer is NO in step 305, the procedure proceeds to step 308 in which the computer determines that the fuel pressure sensor 32 and the high-pressure pump 14 have no malfunction.

The RPMDC is executed as described above.

Figure 5:
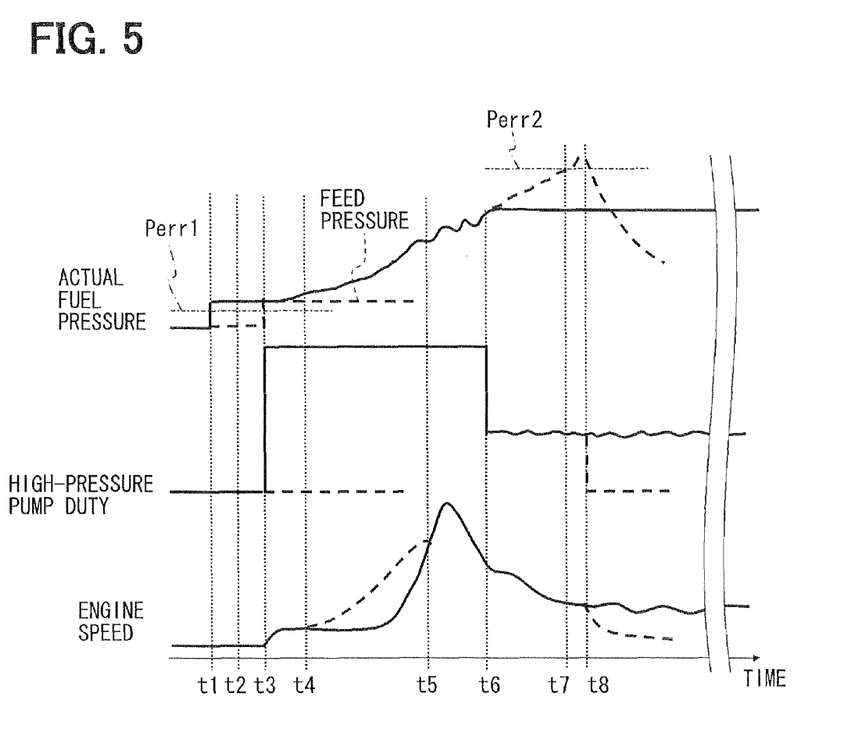
FIG. 5 is a time chart showing a starting-period malfunction-detecting-control.
Figure 6:
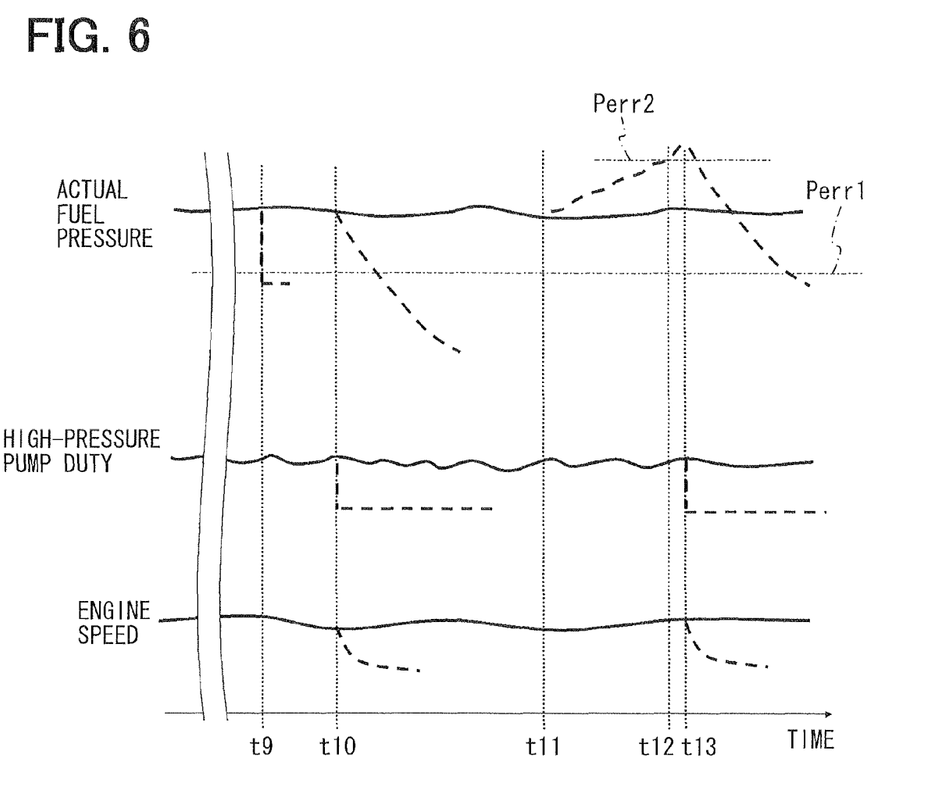
FIG. 6 is a time chart showing a running-period malfunction-detecting-control.

The above malfunction-detecting-control will be explained based on time charts shown in FIGS. 5 and 6. FIG. 5 is a time chart showing the SPMDC. FIG. 6 is a time chart showing the RPMDC. In FIGS. 5 and 6, solid lines respectively represent the actual fuel pressure, a high-pressure pump DUTY and an engine speed of a case that the fuel pressure sensor 32 and the high-pressure pump 14 have no malfunction. Dashed lines respectively represent the actual fuel pressure, the high-pressure DUTY and the engine speed of a case that a malfunction occurs or the fail-safe control is executed. Long dashed short dashed lines respectively represent the feed pressure, the first threshold Perr1, and the second threshold Perr2.

Referring to FIG. 5, the SPMDC (steps 201-211) will be explained hereinafter. From a time t1 to a time t4, a malfunction-detection is executed with respect to the fuel pressure sensor 32. From the time t4 to a time t8, a malfunction-detection is executed with respect to the high-pressure pump 14. At the time t1, the ignition switch is turned on and the feed pump 12 starts to be driven, so that the actual fuel pressure is increased to the feed pressure. At a time t2, a fuel pressure sensor output Pr is obtained. When the fuel pressure sensor 32 has no malfunction, the feed pressure is detected as shown by a solid line. When the fuel pressure sensor 32 has a malfunction, the fuel pressure can not be detected correctly. Thus, when the detection value of the fuel pressure sensor 32 is lower than the first threshold Perr1, the computer determines that the fuel pressure sensor 32 has a malfunction and the first fail-safe control is executed in which the pressurizing function of the high-pressure pump 14 is suspended and the fuel pressure is kept at the feed pressure.

When no malfunction is detected in the fuel pressure sensor 32 at the time t2, the cranking is started and the high-pressure pump 14 starts to pressurize the fuel at a time t3. From a time t4, the actual fuel pressure starts to increase. When a malfunction is detected in the fuel pressure sensor 32 at the time t2, the high-pressure pump 14 does not pressurize the fuel after a time t3 as shown by a dashed line of the high-pressure pump DUTY in FIG. 5. That is, when the fuel pressure sensors 32 has a malfunction, only the feed pump 12 is driven to generate the feed pressure after the time t2.

Next, a malfunction-detection in the high-pressure pump 14 which is conducted from the time t4 to the time t8 will be explained hereinafter. As described above, when the fuel pressure sensor 32 has no malfunction, the actual fuel pressure starts to increase from the time t4. Then, at the time t5, the cranking of the engine is finished and the fuel injection is started. At the time t6, the fuel pressure becomes a specified pressure and the high-pressure pump DUTY is decreased, whereby the fuel pressure for idling is maintained. On the other hand, when the high pressure pump 14 has a malfunction, it is likely that the fuel pressure continues to increase as shown by a dashed line even though the high-pressure pump DUTY is decreased at the time t6. The actual fuel pressure exceeds the second threshold Perr2 at a time t7 and the computer determines that the high-pressure pump 14 has a malfunction. Then, at the time t8, the second fail-safe control is executed. In the second fail-safe control, the engine is turned off and the restarting of the engine is prohibited. Meanwhile, when no malfunction is detected in the high-pressure pump 14 at the time t7, the computer determines that the fuel pressure sensor 32 and the high-pressure pump 14 have no malfunction, and the fuel pressure feedback control is executed.

Referring to FIG. 6, the RPMDC (steps 301-308) will be explained hereinafter. From a time t9 to a time t10, a malfunction-detection is executed with respect to the fuel pressure sensor 32. From a time t11 to a time t13, a malfunction-detection is executed with respect to the high-pressure pump 14.

When the fuel pressure sensor 32 has no malfunction, the fuel pressure sensor 32 detects the actual fuel pressure at the time t9 as shown by a solid line. However, if the fuel pressure 32 has a malfunction, it is likely that the fuel pressure sensor may not detect the fuel pressure. Thus, when the detection value of the fuel pressure sensor 32 is less than the first threshold Perr1, the computer determines that the fuel pressure sensor 32 has a malfunction. Then, at a time t10, the first fail-safe control is executed.

In a case that the fuel pressure sensor 32 has no malfunction, a malfunction-detection in the high-pressure pump 14 is conducted from the time t11 to the time t13. At the time t11, the detection value (actual fuel pressure) of the fuel pressure sensor 32 starts to increase as shown by a dashed line. Then, the actual fuel pressure exceeds the second threshold Perr2 at a time t12 and the computer determines that the high-pressure pump 14 has a malfunction. Then, at the time t13, the second fail-safe control is executed. In the second fail-safe control, the engine is turned off and the restarting of the engine is prohibited.

An operation and an advantage of the present embodiment will be described hereinafter.

According to the present embodiment, by comparing the fuel pressure with the first threshold Perr1 and the second threshold Perr2, it is determined whether the fuel pressure sensor 32 has a malfunction or the high-pressure pump 14 has a malfunction. The first threshold Perr1 and the second threshold Perr2 are defined in view of a variation in the fuel pressure between a case that the fuel pressure sensor 32 and the high-pressure pump 14 have a malfunction and a case that the fuel pressure sensor 32 and the high-pressure pump 14 have no malfunction. More specifically, the detection value of the fuel pressure sensor 32 is lowered in a case that the fuel pressure sensor 32 has a malfunction. Further, the fuel pressure excessively increases in a case that the high-pressure pump 14 has a malfunction. In view of these facts, the first threshold Perr1 and the second threshold Perr2 are defined.

Thereby, a suitable fail-safe control can be executed according to a portion (a fuel pressure sensor or a high-pressure pump) having a malfunction. Specifically, when the fuel pressure sensor 32 has a malfunction, the first fail-safe control is executed. When the high-pressure pump 14 has a malfunction, the second fail-safe control is executed. If the high-pressure pump 14 has a malfunction, it is likely that the high-pressure fuel system is more damaged than a case that the fuel pressure sensor 32 has a malfunction. Thus, when the high-pressure pump 14 has a malfunction, the second fail-safe control is executed so that the engine is turned off and the restarting of the engine is prohibited.

Further, the first threshold Perr1 is set lower than the feed pressure which depends on only the feed pump 12. The second threshold Perr2 is set slightly lower than the relief pressure. Thus, a malfunction in the fuel pressure sensor 32 and a malfunction in the high-pressure pump 14 can be easily distinguished from each other. Furthermore, since the first threshold Perr1 and the second threshold Perr2 are not varied between the starting period and the running period, the detection of a malfunction can be easily conducted.

In the SPMDC, in view of the fact that the fuel pressure is increased only by the feed pump 12 from the time of ignition-on to the time of cranking-start, a malfunction in the fuel pressure sensor 32 is detected based on the detection value of the fuel pressure sensor 32. Then, when the cranking is finished and the engine is idling, a malfunction in the high-pressure pump 14 is detected based on the detection value of the fuel pressure sensor 32. Thereby, a malfunction in the fuel pressure sensor 32 and a malfunction in the high-pressure pump 14 can be detected at different timing. These malfunctions can be distinguished from each other and the malfunction can be detected early at the starting-period.

As above, the malfunctions in the fuel pressure sensor 32 and the high-pressure pump 14 can be easily distinguished and a suitable fail-safe control can be executed according to a time at which a malfunction occurs. The vehicle can travel as long as possible with high safety.

Second Embodiment

In a second embodiment and the successive embodiments, the same parts and components as those in the first embodiment are indicated with the same reference numerals and the same descriptions will not be reiterated.

Figure 7:
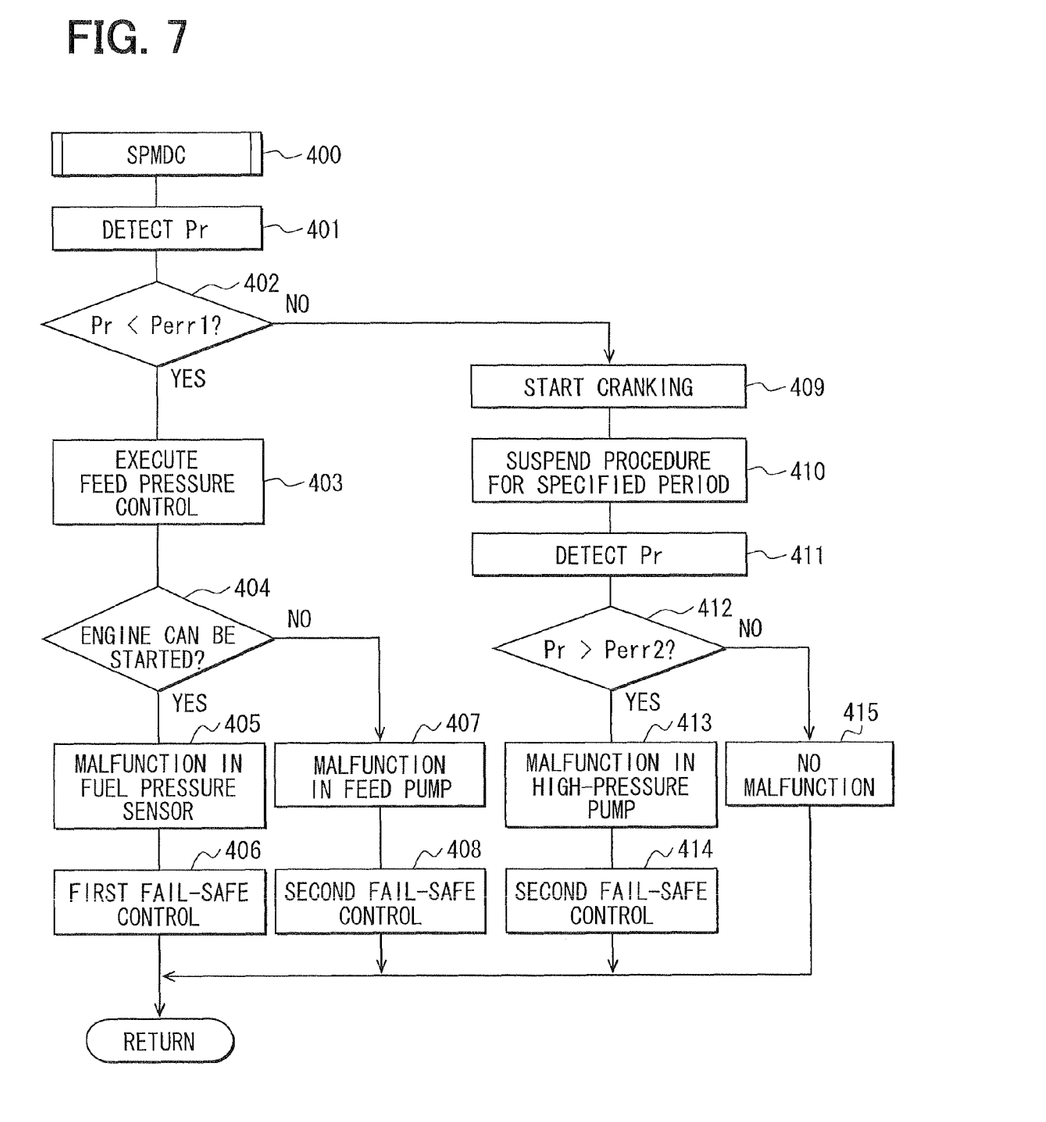
FIG. 7 is a flowchart showing a processing of a starting-period malfunction-detecting-control according to a second embodiment.

In the first embodiment, malfunctions in the fuel pressure sensor 32 and the high-pressure pump 14 are detected in step 200. In the second embodiment, a malfunction in the feed pump 12 is detected instead of the fuel pressure sensor 32 and the high-pressure pump 14 in step 400. In the first embodiment, when the fuel pressure Pr is less than the first threshold Perr1 in step 202, the computer determines that the fuel pressure sensor has a malfunction. If the feed pump 12 has a malfunction, the fuel pressure Pr is less than the first threshold Perr1. Even if the fuel pressure sensor 32 has no malfunction, it is likely that the fuel pressure does not increase due to a malfunction in the fee pump 12. In view of this, a malfunction in the fuel pressure sensor 32 and a malfunction in the feed pump 12 are detected independently.

Figure 8:
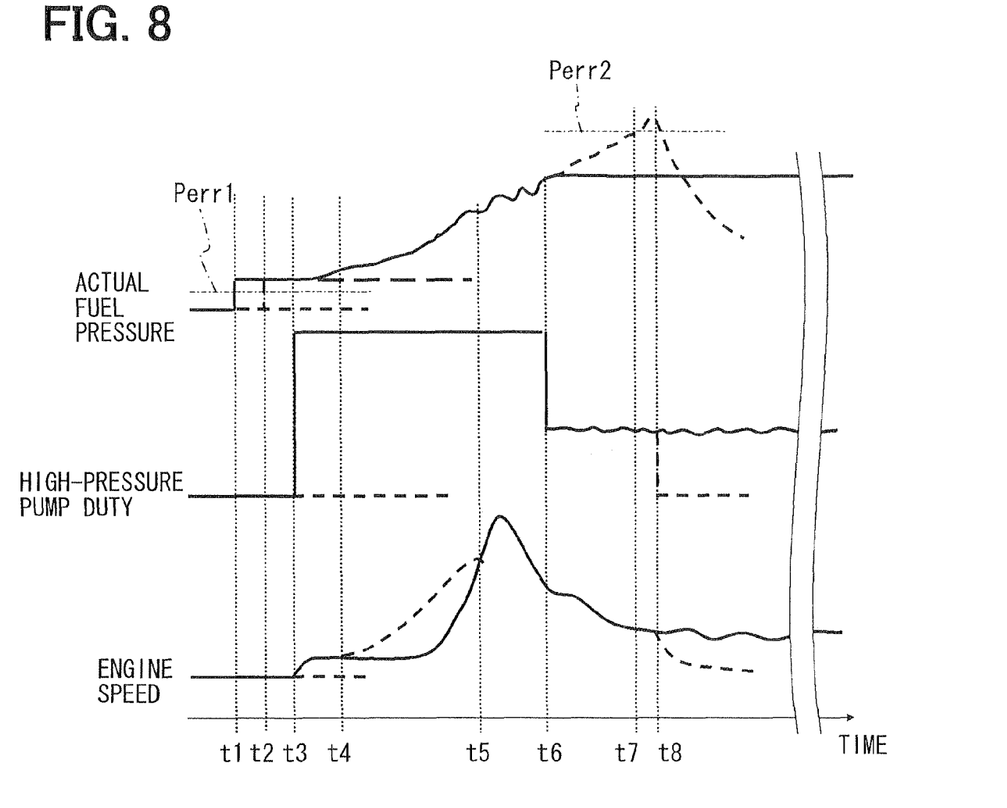
FIG. 8 is a time chart showing a starting-period malfunction-detecting-control according to the second embodiment.

Referring to FIGS. 7 and 8, a malfunction-detecting-control according to the second embodiment will be described hereinafter. The procedures in steps 409 to 415 in FIG. 7 are the same as those in steps 205 to 211 in FIG. 3.

In step 401, the fuel pressure sensor 32 detects the current fuel pressure Pr which is increased by the feed pump 12. This detected fuel pressure Pr is transmitted to the ECU 38. Then, the procedure proceeds to step 402 in which the computer determines whether the fuel pressure Pr detected in step 401 is less than the first threshold Perr1 (Pr<Perr1).

When Pr<Perr1, it can be determined that at least one of the fuel pressure sensor 32 and the feed pump 12 has a malfunction. However, it can not be determined which one of them has a malfunction. The procedure proceeds to step 403 in which the pressurizing function of the high-pressure pump 14 is suspended and a feed pressure control is executed. In other words, when the fuel pressure Pr is less than the first threshold Perr1, a provisional fail-safe control is executed.

Then, the procedure proceeds to step 404 in which the computer determines whether the engine can be started by the provisional fail-safe control executed in step 403. Specifically, it is determined whether the feed pressure has been obtained only by the feed pump 12 after the pressurizing function of the high-pressure pump is suspended. When the engine can be started at the feed pressure (YES in step 404), the procedure proceeds to step 405 in which the computer determines that the fuel pressure sensor 32 has a malfunction. Then, the procedure proceeds to step 406 in which the pressurizing function of the high-pressure pump 14 is suspended and the feed pressure control is continued.

When the engine can not be started at the feed pressure (NO in step 404), the procedure proceeds to step 407 in which the computer determines that the feed pump 12 has a malfunction. Then, the procedure proceeds to step 408 in which the engine is turned off and a restarting of the engine is prohibited.

Referring to FIG. 8, the malfunction-detecting-control of the fuel pressure sensor 32 and the feed pump 12 in steps 401 to 408 will be explained, hereinafter. In FIG. 8, solid lines respectively represent the actual fuel pressure, a high-pressure pump DUTY and an engine speed of a case that the fuel pressure sensor 32, the feed pump 12 and the high-pressure pump 14 have no malfunction. Dashed lines respectively represent the actual fuel pressure, the high-pressure DUTY and the engine speed of a case that a malfunction occurs or the fail-safe control is executed. Long dashed short dashed lines respectively represent the feed pressure, the first threshold Perr1, and the second threshold Perr2. In the third and the successive embodiments, the same parts and components as those in the first and the second embodiments are indicated with the same reference numerals and the same descriptions will not be reiterated. The malfunction detecting in the high-pressure pump 14 which is executed from the time t5 to the time t8 will not be reiterated.

At the time t1, when the fuel pressure sensor 32 and the feed pump 12 have no malfunction, the feed pump 12 is driven and the actual fuel pressure is increased to the feed pressure. At the time t2, the feed pressure is detected. If at least one of the fuel pressure 32 and the feed pump 12 has a malfunction, the correct fuel pressure can not be detected. Thus, when the detection value of the fuel pressure sensor 32 at the time t2 is lower than the first threshold Perr1, the provisional fail-safe control is executed in which the pressurizing function of the high-pressure pump 14 is suspended and the feed pressure control is executed.

When the fuel pressure is normal at the time t2, the cranking is started and the high-pressure pump 14 starts to pressurize the fuel at the time t3. From a time t4, the actual fuel pressure starts to increase along with the pressurization by the high-pressure pump 14. Meanwhile, in a case that the provisional fail-safe control has been executed at the time t2, the engine is started at the feed pressure. Thus, in a case that the engine can be started at feed pressure at the time t3, the fuel pressure sensor 32 has a malfunction and its detection value is lower than the first threshold Perr1. That is, the computer determines that the fuel pressure sensor 32 has a malfunction at the time t3. The pressurizing function of the high-pressure pump 14 is suspended and the feed pressure control is continued. If the actual fuel pressure does not reach the feed pressure at the time t3 as shown by a dashed line, the computer determines that the feed pump 12 has a malfunction. The engine is turned off and the restarting of the engine is prohibited.

According to the second embodiment, in addition to the same advantage as the first embodiment stated above, a malfunction in the feed pump 12 can be detected in a starting period so that a suitable fail-safe control can be executed.

Specifically, when a malfunction is detected in the fuel pressure sensor 32 or the feed pump 12 by comparing the fuel pressure with the first threshold Perr1, the provisional fail-safe control is executed. Furthermore, a malfunction in the fuel pressure sensor 32 and a malfunction in the feed pump 12 can be distinguished from each other according to whether the engine can be started by the provisional fail-safe control. When a malfunction is detected in the feed pump 12, the second fail-safe control is executed.

As described above, according to the above embodiments, a fail-safe controller is capable of detecting each malfunction in a high-pressure fuel supply system and executing a suitable fail-safe control according to a portion in which a malfunction occurs and a time point at which a malfunction occurs.

Other Embodiment

In the above embodiments, the second threshold Perr2 is set slightly smaller than the relief pressure. Alternatively, the second threshold Perr2 may be set larger than the relief pressure. Although the relief valve 33 is opened when the fuel pressure is excessively increased, it is likely that the relief valve 33 adheres to the valve seat and is not opened even if the fuel pressure exceeds the specified value. By setting the second threshold Perr2 larger than the relief valve, a malfunction in the high pressure pump 14 and a malfunction in the relief valve can be detected.

What is claimed is:

1. A fail-safe controller for a direct injection engine, the direct injection engine including:
    a feed pump pumping up a fuel in a fuel tank;
    a high-pressure pump pressurizing the fuel pumped up by the feed pump, the high-pressure pump introducing the pressurized fuel into a delivery pipe;
    a fuel pressure sensor detecting a fuel pressure in the delivery pipe; and
    a fuel injector directly injecting the fuel accumulated in the delivery pipe into a cylinder of the direct injection engine,
    the fail-safe controller comprising:
    a malfunction detecting means for detecting a malfunction in the fuel pressure sensor by comparing a detection value of the fuel pressure sensor with a first threshold, and for detecting a malfunction in the high-pressure pump by comparing the detection value of the fuel pressure sensor with a second threshold which is greater than the first threshold; and
    a fail-safe control means for executing a first fail-safe control in which the direct injection engine is kept running when the malfunction detecting means detects malfunction in the fuel pressure sensor, and for executing a second fail-safe control in which the direct injection engine is turned off when the malfunction detecting means detects a malfunction in the high-pressure pump.

2. A fail-safe controller for a direct injection engine according to claim 1, wherein
    the first threshold is lower than a feed pressure representing a fuel pressure which depends on only an operation of the feed pump, and
    the second threshold is greater than the feed pressure and smaller than a relief pressure representing a fuel pressure at which a relief valve is opened in order to restrict an excessive increase in fuel pressure in the delivery pipe.

3. A fail-safe controller for a direct injection engine according to claim 1, wherein when the malfunction detecting means detects a malfunction in the fuel pressure sensor, the fail-safe control means suspends a pressurizing function of the high-pressure pump and holds the fuel pressure at the feed pressure, and when the malfunction detecting means detects a malfunction in the high-pressure pump, the fail-safe control means turns off the direct injection engine and prohibits a restarting thereof.

4. A fail-safe controller for a direct injection engine according to claim 1, wherein the malfunction detecting means includes: a starting-period malfunction detecting means which detects a malfunction in the fuel pressure sensor and the high-pressure pump when the direct injection engine is started; and a running-period malfunction detecting means which detects a malfunction in the fuel pressure sensor and the high-pressure pump when the direct injection engine is running, and the starting-period malfunction detecting means detects a malfunction in the fuel pressure sensor based on a detection value of the fuel pressure sensor during a starting period of the direct injection engine until a cranking is started, and detects a malfunction in the high-pressure pump based on a detection value of the fuel pressure sensor when a specified time period is elapsed after the cranking is finished.

5. A fail-safe controller for a direct injection engine according to claim 4, wherein the starting-period malfunction detecting means detects a malfunction in at least one of the fuel pressure sensor and the feed pump based on a detection value of the fuel pressure sensor during a period until the cranking is started, and the starting-period malfunction detecting means distinguishes between a malfunction in the fuel pressure sensor and a malfunction in the feed pump according to whether the fuel pressure reaches the feed pressure after the cranking is started.

6. A fail-safe controller for a direct injection engine according to claim 5, wherein when the starting-period malfunction detecting means detects a malfunction in the fuel pressure sensor, the fail-safe control means suspends a pressurizing function of the high-pressure pump and holds the fuel pressure in the delivery pipe at the feed pressure, and when the malfunction detecting means detects a malfunction in the feed pump or the high-pressure pump, the fail-safe control means turns off the direct injection engine and prohibits a restarting thereof.

* * * * *